United States Patent
Mitamura et al.

(10) Patent No.: US 7,053,361 B2
(45) Date of Patent: May 30, 2006

(54) PROJECTION ENCODER WITH MOVING SIDE GRATINGS AND FIXED SIDE GRATINGS

(75) Inventors: Muneo Mitamura, Nagano-ken (JP); Kazuhiro Hane, 9-21-5, Nakayama, Aoba-ku, Sendai-shi, Miyagi-ken, 981-0952 (JP); Yoshinori Ito, Nagano-ken (JP)

(73) Assignees: Harmonic Drive Systems Inc., Tokyo (JP); Kazuhiro Hane, Miyagi-ken (JP)

( * ) Notice: Subject to any disclaimer, the term of this patent is extended or adjusted under 35 U.S.C. 154(b) by 0 days.

(21) Appl. No.: 10/828,184

(22) Filed: Apr. 21, 2004

(65) Prior Publication Data

US 2004/0262504 A1 Dec. 30, 2004

(30) Foreign Application Priority Data

May 9, 2003 (JP) .............................. 2003-130927

(51) Int. Cl.
*G01D 5/43* (2006.01)
(52) U.S. Cl. .............................. 250/231.13; 250/231.16
(58) Field of Classification Search ..............................
250/231.13–231.19
See application file for complete search history.

(56) References Cited

U.S. PATENT DOCUMENTS 6,528,779 B1 * 3/2003 Franz et al. ............. 250/214.1

FOREIGN PATENT DOCUMENTS

JP 2000-321097 A 11/2000

* cited by examiner

*Primary Examiner*—Thanh X. Luu
*Assistant Examiner*—Tony Ko
(74) *Attorney, Agent, or Firm*—Buchanan Ingersoll PC

(57) ABSTRACT

A projection linear encoder has an SOQ substrate formed with transmission gratings and grid-like photodiode groups, and a reflecting grating plate with reflecting gratings that are formed facing thereto. A light-blocking film composed of a metal thin film or the like is formed on a surface of a glass substrate of the SOQ substrate, and the transmission gratings are formed by patterning the light-blocking film. The photodiodes are integrally formed by epitaxial growth on the silicon layer of the SOQ substrate. Transmission gratings with high mechanical strength can be formed inexpensively in comparison with cases in which through holes are formed by etching a silicon substrate to manufacture transmission gratings.

10 Claims, 7 Drawing Sheets

REFLECTING TYPE

FIG.5
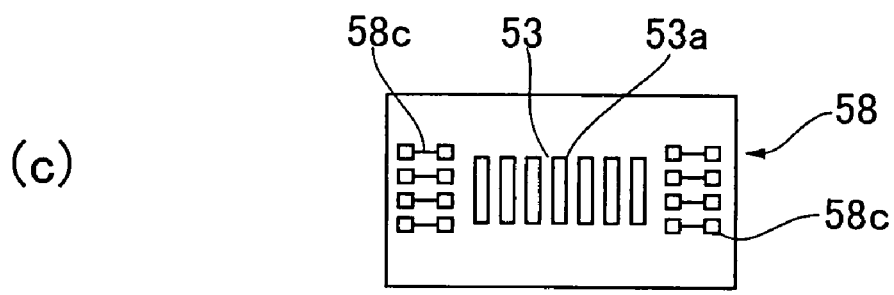
B SURFACE
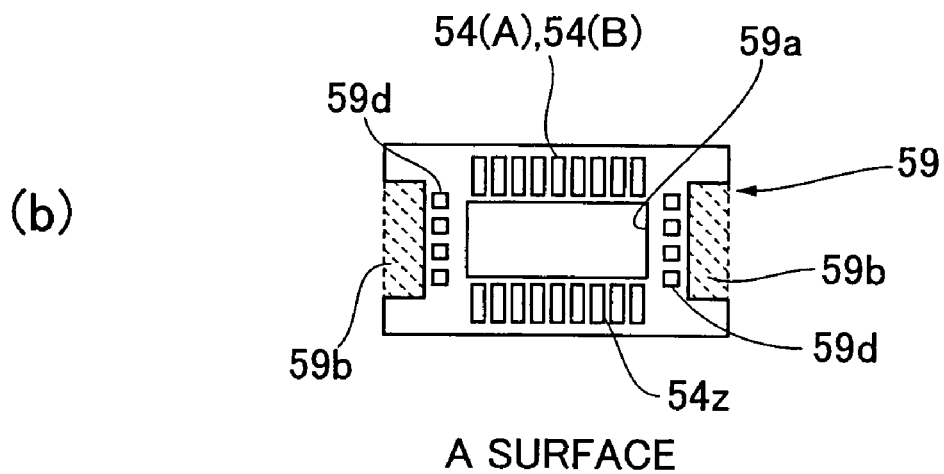
A SURFACE
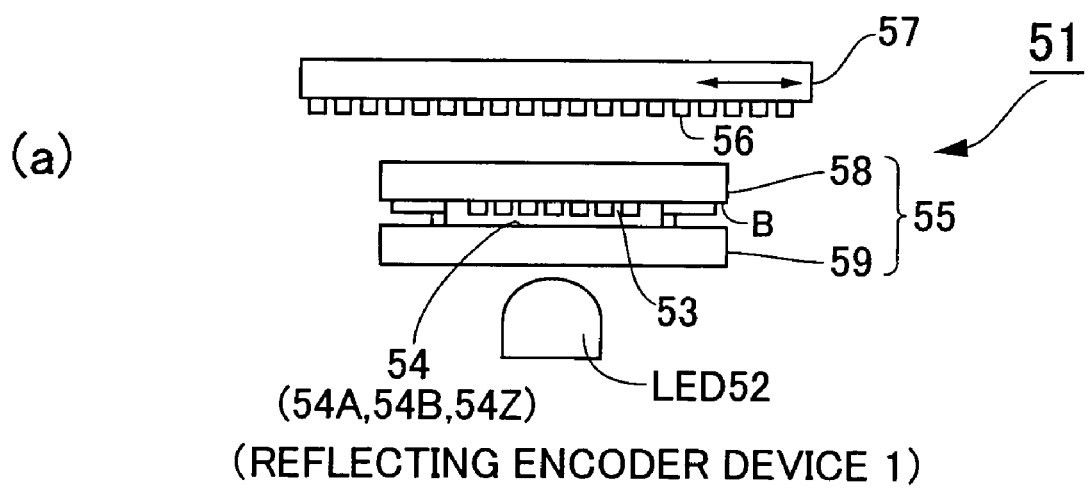
(REFLECTING ENCODER DEVICE 1)

FIG.6
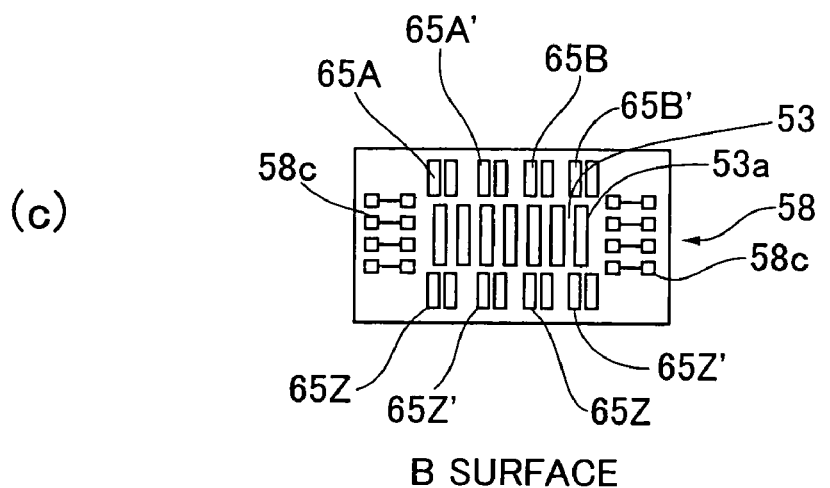
B SURFACE
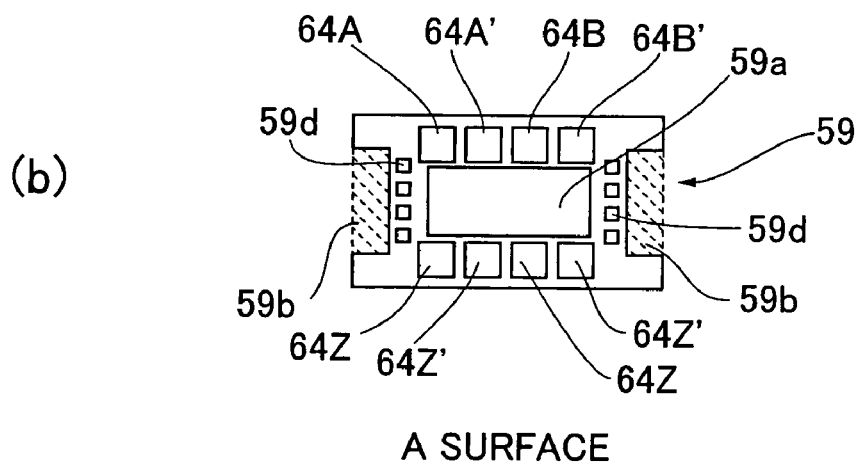
A SURFACE
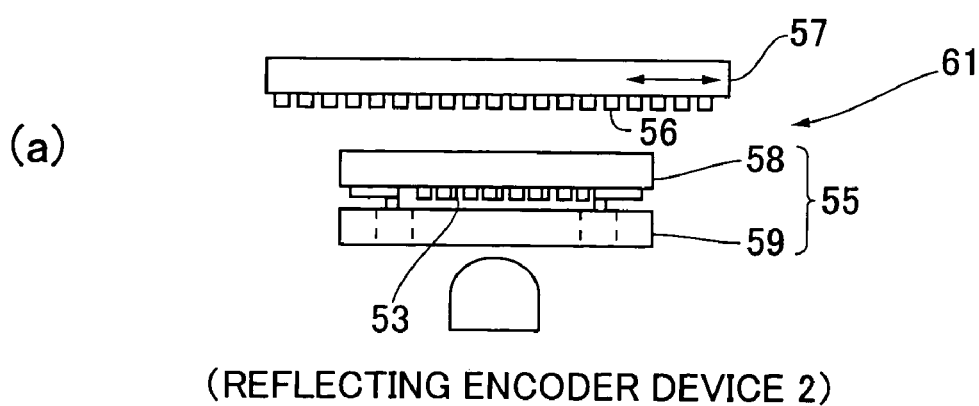
(REFLECTING ENCODER DEVICE 2)

FIG.7
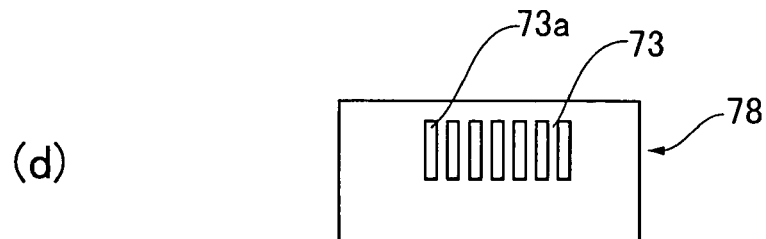
C SURFACE
(d)
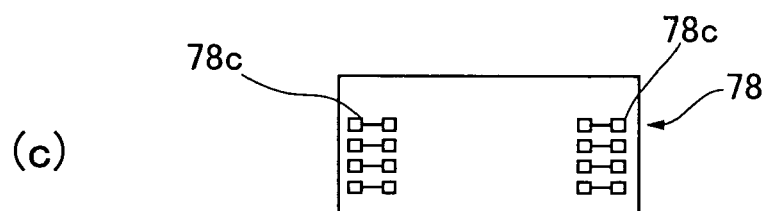
B SURFACE
(c)
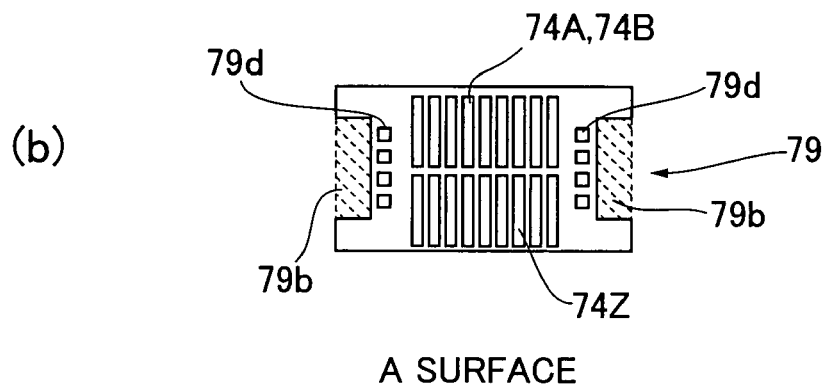
A SURFACE
(b)
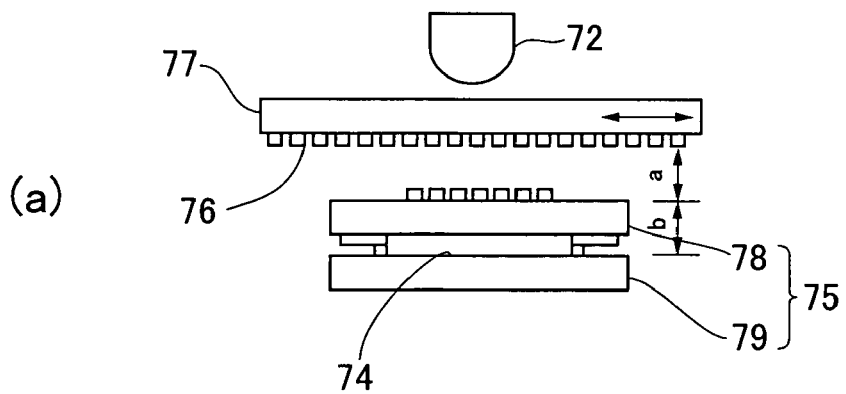
(TRANSMISSIVE ENCODER DEVICE)
(a)

PROJECTION ENCODER WITH MOVING SIDE GRATINGS AND FIXED SIDE GRATINGS

BACKGROUND OF THE INVENTION

1. Field of the Invention

The present invention relates to a projection encoder based on a triple-grating concept, and more particularly to an improved technique for enhancing the mechanical strength and reducing the manufacturing cost of a grating portion integrally formed in a semiconductor substrate.

2. Description of the Related Art

The present applicant has already proposed in JP-A 2000-321097 a projection encoder based on a triple-grating concept. The projection encoder of this type comprises an LED as a light source, a movable plate composed of a semiconductor substrate on which transmission gratings and photodetectors (photodiodes) are integrally formed at a constant pitch, and a reflecting grating plate (fixed plate) on which reflecting gratings are formed at a constant pitch, in which the movable plate is disposed between the LED and the reflecting grating plate.

In the projection encoder with this structure, the movable plate is integrated with the measurement object and is caused to move within a plane perpendicular to the optical axis of light emitted by the LED in the direction along which the light transmission gratings and photodiodes are arranged. Light emitted by the LED first strikes the back surface of the movable plate, passes through the transmission gratings on the movable plate, and illuminates the surface of the reflecting grating plate in a pattern of grating stripes. Reflecting gratings are also formed at a constant pitch on the reflecting grating plate, making it possible to reflect only those components of light striking the reflecting grating plate that irradiate the reflecting gratings. The reflecting grating image is caused to re-irradiate the movable plate, and is received by photodiodes shaped as vertical stripes and formed at a constant pitch and a constant width.

The photodiodes and transmission gratings shaped as vertical stripes on the movable grating plate function as separate gratings. Consequently, the amount of light received by a photodiode is converted, based on a triple-grating concept of three gratings including reflecting grating, to a sinusoid waveform in accordance with the relative movement of the reflecting grating plate and the movable grating plate. It is thus possible to obtain a pulse signal that corresponds to the relative speed of travel and is based on the photocurrent of the photodiodes, and to calculate the relative speed of travel on the basis of the pulse rate of the pulse signal.

In addition, arranging the photodiodes such that an A-phase signal and a B-phase signal differing in phase by 90 degrees can be obtained makes it possible to determine the movement direction of the movable grating plate on the basis of these two-phase signals.

Thus, the transmission gratings and photodetectors of the optical encoder disclosed in the above publication are fabricated using semiconductor manufacturing technology, so the precision of the relative positions thereof is high and they can be formed with excellent precision. In addition, the photodetectors formed in a pattern of vertical stripes at a constant pitch function as a grating, and the grating itself has a lens effect, so an optical lens system can be dispensed with and the device can be made smaller. Another feature is that the use of the triple-grating concept prevents resolution from being adversely affected by the width or variability of gaps between such reflecting gratings and light transmission gratings, so the adjustment operations needed to ensure the required mounting accuracy for the members provided with these gratings can be simplified, and the restrictions imposed on the mounting locations can be eased. In addition to this, the interval between the reflecting gratings and transmission gratings can be increased, making it possible to obtain benefits such as achieving better environmental resistance by, for example, housing the reflecting gratings in a protective casing.

However, a projection encoder with this structure has drawbacks such as the following. First, in a projection encoder with this structure, transmission gratings and photodetectors are integrally formed on a semiconductor substrate with the aid of semiconductor manufacturing technology. The drawback is that the semiconductor substrate portion on which the transmission gratings are formed has a structure in which a large number of transmission gratings is formed with a very small pitch in the thinly etched portions, and the mechanical strength is therefore very low.

A Deep-RIE device or other expensive devices must be used to form gratings with such a very small pitch by etching. For this reason, there is a drawback in that the manufacturing cost is higher.

SUMMARY OF THE INVENTION

In view of the above, an object of the present invention is to provide a projection encoder configured such that the mechanical strength of the transmission gratings is high and that the encoder components in which the transmission gratings are formed can be manufactured at low cost.

To solve the above and other objects in accordance with the present invention, there is provided a projection encoder comprising a light source, moving-side gratings arranged at a constant pitch, fixed-side gratings arranged at a constant pitch, a grid of photodetectors arranged at a constant pitch, and an SOQ substrate having a glass substrate and a silicon layer formed on a surface of the glass substrate; wherein the grid of photodetectors is formed on the silicon layer of the SOQ substrate; transmission gratings are formed by laminating a light-blocking film onto the front surface or back surface of the glass substrate and patterning the blocking film; and the transmission gratings are moving-side or fixed-side gratings.

In the present invention, the transmission gratings are formed by patterning the light-blocking film laminated on the glass substrate of the SOQ substrate. Therefore, the mechanical strength of the grating-forming portion is high, which is different from the case in which through holes are formed in a silicon substrate by etching to form transmission gratings. It is sufficient to merely pattern a light-blocking film comprising aluminum, chromium, or another metal, and transmission gratings can therefore be formed simply and inexpensively in comparison with etching the silicon substrate to form through holes for the gratings. As a result, a projection encoder can be manufactured at a lower cost.

Here, a light-blocking film is laminated on a surface portion of the glass substrate that has been exposed by etching away the silicon layer of the SOQ substrate, and the light-blocking film is patterned, whereby the transmission gratings can be formed. In this case, either the moving-side gratings or the fixed-side gratings should be designated as transmission gratings, and the others are designated as reflecting gratings.

A structure is also possible whereby a reflecting film is formed on the back surface of the glass substrate, and light emitted by the light source is first reflected from the reflecting gratings, is then allowed to reach the reflecting film via the transmission gratings and the glass substrate, is reflected by the reflecting film, and is subsequently directed to the grid-like light-receiving surface. According to this configuration, the interior of the glass substrate may be used as a waveguide.

Furthermore, in the case of a transmission-type projection encoder, both the moving-side gratings and fixed-side gratings are transmission gratings. In this case, one of the two groups of transmission gratings may be formed by patterning the light-blocking film laminated on the back surface of the SOQ substrate.

Next, a laminate comprising a glass substrate and a silicon substrate may be used instead of an SOQ substrate. In other words, the projection encoder of the present invention comprises a light source, moving-side gratings arranged at a constant pitch, fixed-side gratings arranged at a constant pitch, a grid of photodetectors arranged at a constant pitch, and a laminate having a glass substrate and a silicon substrate laminated on a front surface of the glass substrate; wherein the photodetectors are formed in the silicon substrate from a surface thereof facing the glass substrate; transmission gratings are formed by laminating a light-blocking film on the front surface or the back surface of the glass substrate, and patterning the light-blocking film; and the transmission gratings are either the moving-side gratings or the fixed-side gratings.

In this configuration as well, the transmission gratings are formed by patterning the light-blocking film laminated on the glass substrate, instead of etching through holes for the transmission gratings in the silicon substrate. Hence, the mechanical strength of the transmission grating portion is not reduced and the gratings can be manufactured with an inexpensive device.

Here, when the transmission gratings are formed on the surface of the glass substrate that faces the silicon substrate, the portion of the silicon substrate that faces the transmission gratings is fashioned into an aperture portion.

At least one photodetector provided with a light-receiving surface of predetermined width may also be integrally formed on the silicon substrate instead of the grid of photodetectors. In this case, a light-blocking film is laminated to the surface portion of the glass substrate that faces the light-receiving surface, and this light-blocking film is patterned, whereby transmission grating windows arranged at a constant pitch are formed.

Furthermore, a configuration may be adopted whereby an electrode wiring film is formed on the surface of the glass substrate that faces the silicon substrate, and the portion of the silicon substrate that faces the electrode wiring film is removed by etching or the like to expose the electrode wiring film.

BRIEF DESCRIPTION OF THE DRAWINGS

FIG. 5 is a schematic diagram showing a projection encoder configured using the laminate of FIG. 4;

FIG. 6 is a schematic diagram showing a modified example of the projection encoder of FIG. 5; and FIG. 7 is a schematic diagram showing a projection encoder configured using the laminate of FIG. 4.

DESCRIPTION OF THE PREFERRED EMBODIMENTS

Embodiments of the projection encoder to which the present invention has been applied are described below with reference to the drawings.

(Examples of Using SOQ Substrate)

Figure 1:
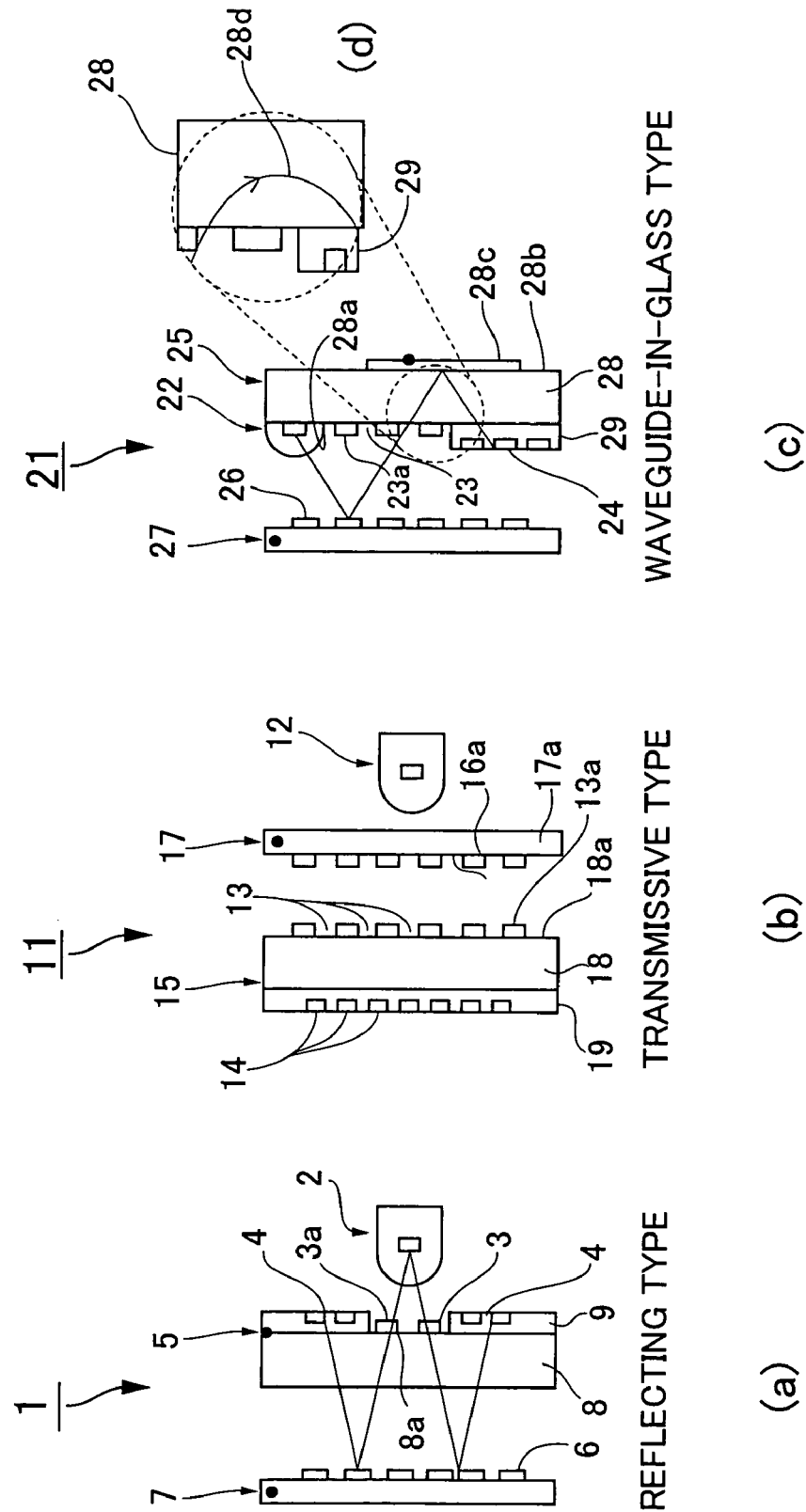
FIG. 1 is a schematic diagram showing an example of a projection encoder to which the present invention has been applied.

FIG. 1(a) is a schematic diagram showing a reflecting-type projection linear encoder to which the present invention has been applied. A projection linear encoder 1 has an LED 2 as a light source, an SOQ substrate 5 integrally formed with a plurality of transmission gratings 3 and a plurality of photodiodes 4, and a reflecting grating plate 7 with a plurality of reflecting gratings 6 formed on the surface thereof. The LED 2 and the SOQ substrate 5 are disposed in a fixed position, and the reflecting grating plate 7 can be moved. Consequently, the transmission gratings 3 are fixed-side gratings, and the reflecting gratings 6 are moving-side gratings.

The SOQ substrate 5 is a substrate with a structure in which a silicon layer 9 is laminated on the surface of a glass substrate 8, and is disposed such that the silicon layer 9 faces the LED 2. The portion of the silicon layer 9 irradiated with light emitted by the LED 2 is etched away and a surface portion 8a of the glass substrate 8 is exposed. A light-blocking film 3a comprising aluminum, chromium, or another metal is formed on the surface portion 8a, and the light-blocking film 3a is patterned, whereby transmission gratings 3 having a constant width and pitch are formed. Also, photodiodes 4 comprising p-n junctions are integrally formed in a grid pattern on a portion surrounding the transmission gratings 3 in the silicon layer 9.

Light emitted from the LED 2 passes through the transmission gratings 3 on the SOQ substrate 5, and strikes the reflecting gratings 6 on the reflecting grating plate 7. An optical reflection image reflected by the reflecting gratings 6 passes through the glass substrate 8 in the SOQ substrate 5 and is detected by the photodiodes 4, and a detected signal from the photodiodes 4 is fed to a control circuit (not shown). The control circuit forms an A-phase signal and a B-phase signal that are shifted in phase by $\frac{1}{4}\lambda$ on the basis of the detected signal from the photodiodes, and the movement velocity, movement direction, and other movement information of the reflecting grating plate 7 are calculated based on the A-phase and B-phase signals. Also, the driving of the LED 2 is controlled through feedback. The configuration and operation of the control circuit is known in the art, so any further description is omitted.

FIG. 1(b) is a schematic diagram showing a transmissive projection encoder to which the present invention has been applied. The projection encoder 11 of this example has an LED 12 as a light source, an SOQ substrate 15 integrally formed with a plurality of transmission gratings 13 and a plurality of photodiodes 14, and a transmission grating plate 17 with a plurality of transmission gratings 16 formed on the surface thereof. The LED 12 and SOQ substrate 15 are disposed in fixed positions, and the transmission grating plate 17 can be moved.

The SOQ substrate 15 is a substrate with a structure in which a silicon layer 19 is laminated on the surface of a glass substrate 18, and is disposed such that the glass substrate 18 faces the LED 12. A light-blocking film 13a comprising aluminum, chromium, or another metal is formed on a surface 18a of the glass substrate 18 that faces the LED 12, and the light-blocking film 13a is patterned, whereby the transmission gratings 13 are formed. Also, photodiodes 14 are integrally formed on the silicon layer 19 on the opposite side.

The transmission grating plate 17 is disposed between the LED 12 and SOQ substrate 15, and comprises a glass substrate 17a and the transmission gratings 16 formed by patterning a light-blocking film 16a formed on the surface of the glass substrate 17a.

Light emitted from the LED 12 illuminates the transmission gratings 13 on the SOQ substrate 15 via the transmission gratings 16 on the transmission grating plate 17, and is then received by the photodiodes 14 on the opposite side via the transmission gratings 13 and glass substrate 18. An encoder signal representing the movement velocity and movement direction of the transmission grating plate 17 is generated based on the amount of light received by the photodiodes 14.

FIG. 1(c) is a schematic diagram showing another reflecting projection encoder to which the present invention has been applied. The projection linear encoder 21 of this example has an LED 22 as a light source, an SOQ substrate 25 integrally formed with a plurality of transmission gratings 23 and a plurality of photodiodes 24, and a reflecting grating plate 27 with a plurality of reflecting gratings 26 formed on the surface thereof. The LED 22 and SOQ substrate 25 are disposed in fixed positions, and the reflecting grating plate 27 can be moved.

The SOQ substrate 25 is a substrate with a structure in which a silicon layer 29 is laminated on the surface of a glass substrate 28. The SOQ substrate 25 and the reflecting grating plate 27 are disposed such that the silicon layer 29 faces the reflecting grating plate 27. The photodiodes 24 are integrally formed in the silicon layer 29. A portion of the silicon layer 29 is etched away, a surface portion 28a of the glass substrate 28 is exposed, and a light-blocking film 23a formed on the surface portion 28a is patterned, whereby the transmission gratings 23 are formed. Furthermore, the LED 22 is mounted on the surface portion 28a of the glass substrate 28. Also, a reflecting film 28c for reflecting light that enters through the transmission gratings 23 toward the photodiodes 24 is formed on a back surface 28b of the glass substrate 28.

Light emitted from the LED 22 illuminates the reflecting gratings 26 on the reflecting gratings plate 27. An optical reflection image reflected by the reflecting gratings 26 enters the glass substrate 28 from the transmission gratings 23 on the SOQ substrate 25, reflects from the reflecting film 28c on the opposite side, and enters the photodiodes 24.

In the projection encoder 21 with this configuration, the LED 22, the photodiodes 24, and the transmission gratings 23 are integrally formed, so a small and compact configuration can be realized.

Here, it is possible to omit the reflecting film 28c and to form a waveguide 28d for guiding the incident light to the light-receiving surface of the photodiodes 24 inside the glass substrate 28, as shown in FIG. 1(d). By forming the waveguide 28d, it is possible to ensure a suitable length of a light path regardless of the thickness of the glass substrate 28.

(Method for Fabricating Photodiodes)

Adopting epitaxial growth as the method for integrally forming photodiodes in the silicon layers 9, 19, and 29 of the SOQ substrates 5, 15, and 25 in each of the above-described examples allows the photodiodes to be integrally formed in very small chips.

Figure 2:
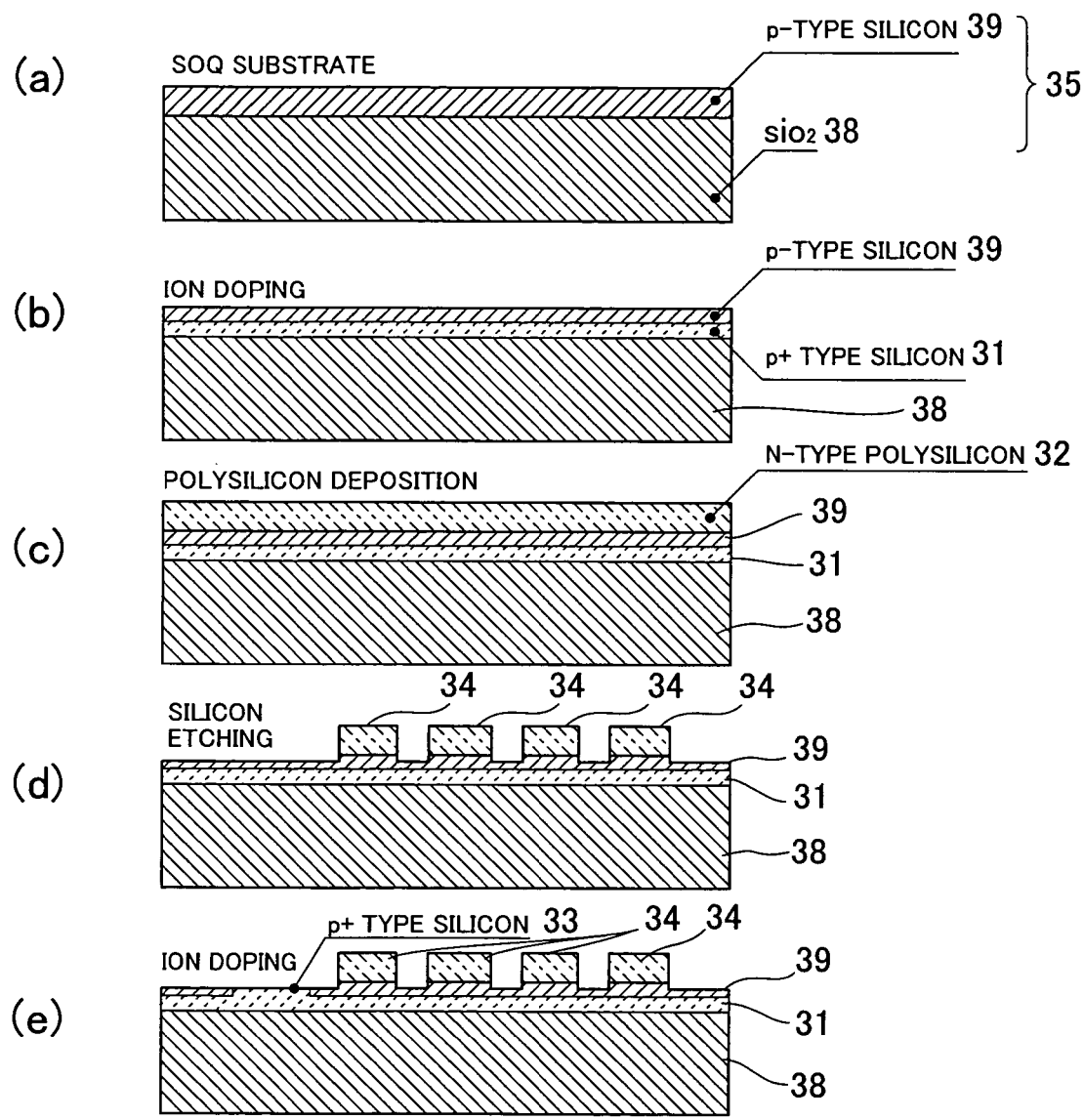
FIG. 2 is a schematic diagram showing a manufacturing process for photodiodes in the projection encoder of FIG. 1.
Figure 3:
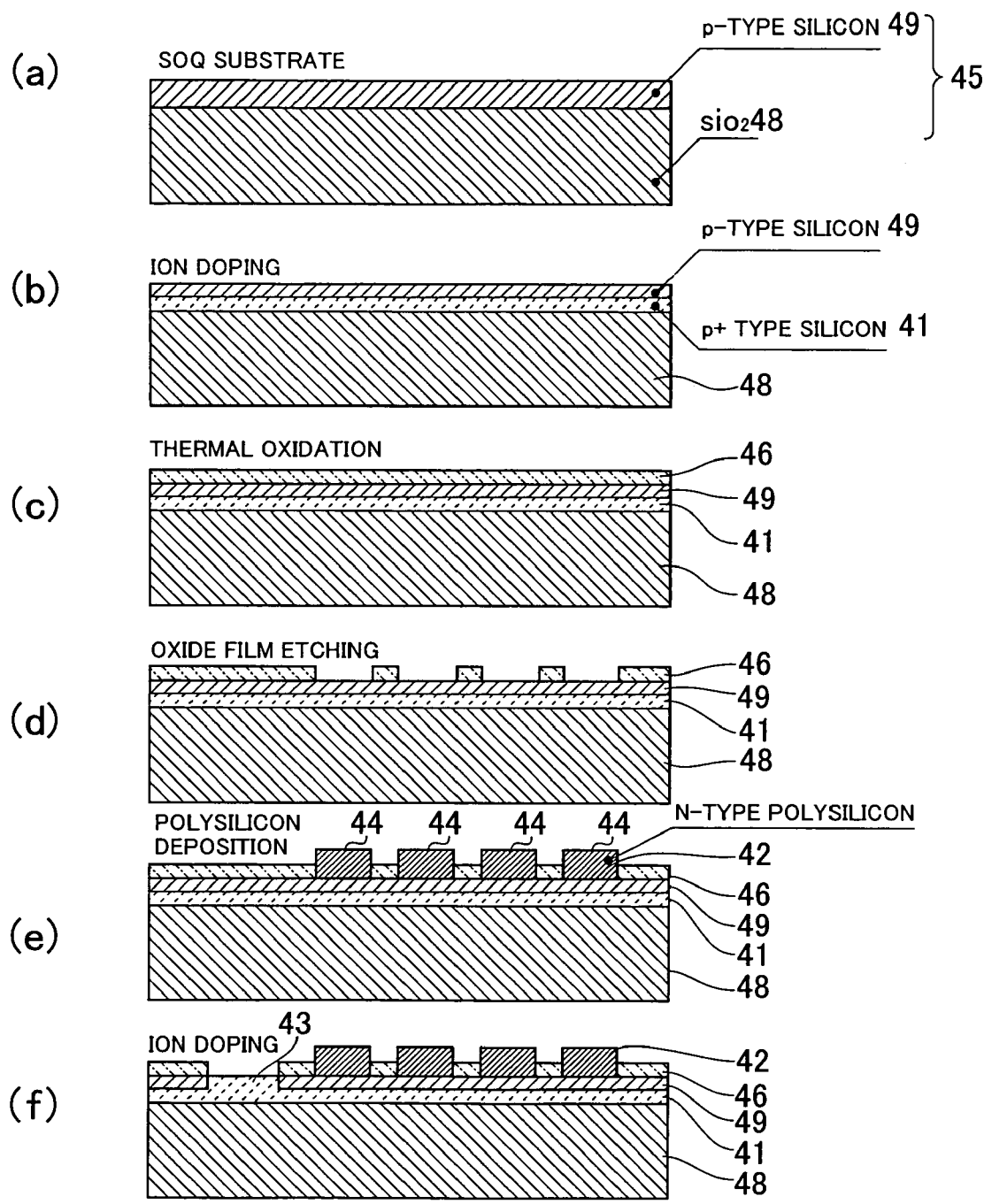
FIG. 3 is a schematic diagram showing another manufacturing process for photodiodes in the projection encoder of FIG. 1.

FIGS. 2 and 3 depict two examples of the manufacturing process for photodiodes. In the process shown in FIG. 2, an SOQ substrate 35 or a wafer is first prepared such that the thickness of the p-type silicon layer 39 is 100 nm to 10 μm and the thickness of the glass substrate 38 is 100 μm to 2 mm (FIG. 2(a)). Next, ions are doped into the silicon layer 39, an impurity concentration in an interface portion with the glass substrate 38 is increased, and a p+ type silicon layer 31 is formed (FIG. 2(b)). Then, an n-type polysilicon layer 32 is made to grow from the surface of the silicon layer 39 by epitaxial growth, and a p-n junction structure is formed (FIG. 2(c)). After this, etching is performed from the surface of the n-type polysilicon layer 32 to a depth that reaches the p-type silicon layer 39, and an array of photodiodes 34 arranged at a constant pitch is formed (FIG. 2(d)). Finally, ions are doped and a p+ type electrode layer 33 is formed in required locations (FIG. 2(e)).

In the case of the above-described process, accuracy is required in the depth and flatness of the etching, and it is difficult to manage the etching conditions because the polysilicon layer formed by epitaxial growth is etched away to form photodiodes. In view of the above, the photodiodes arranged at a constant pitch are preferably fabricated by epitaxial growth, as shown in FIG. 3. Adopting this process has the advantage of allowing interphase leakage current to be inhibited even if the pitch is made small, because adjacent photodiodes are structurally separated from each other.

Describing the process in FIG. 3, the same SOQ substrate 45 as in the case of FIG. 2 is first prepared (FIG. 3(a)), and ions are doped to form a p+ type silicon layer 41 (FIG. 3(b)). A thermal oxidation film 46 is then formed on the surface thereof (FIG. 3(c)). After the thermal oxidation film 46 is etched in the form of a grid (FIG. 3(d)), an n-type polysilicon layer 42 is formed by epitaxial growth on a portion removed by etching, and a p-n junction structure is formed. Photodiodes 44 are thereby formed at a constant pitch (FIG. 3(e)). Finally, a p+ type electrode layer 43 is formed by ion doping (FIG. 3(f)).

(Example of Using a Laminate of Silicon Substrate and Glass Substrate)

Figure 4:
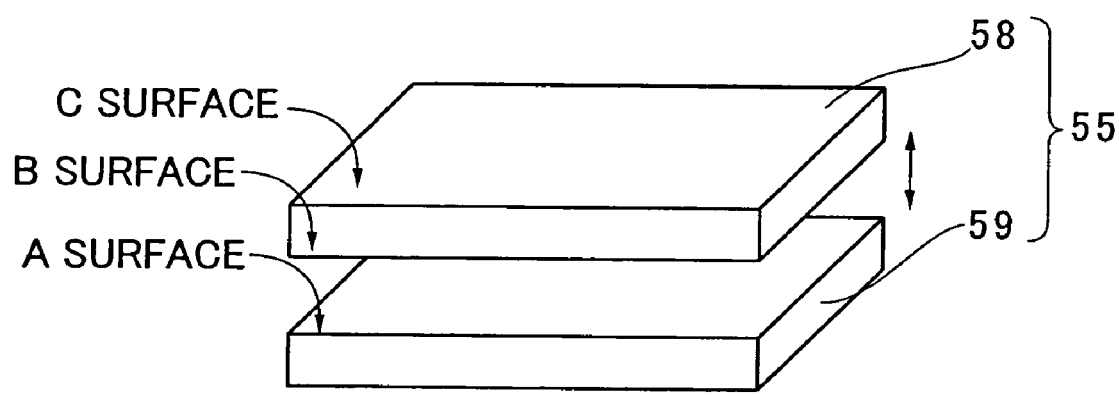
FIG. 4 is a schematic diagram showing a laminate composed of a glass substrate and a silicon substrate that are applicable to the present invention.

Next, the projection encoder can be configured using a laminate 55 comprising a silicon substrate 59 and a glass substrate 58, as shown in FIG. 4, instead of an SOQ substrate.

FIG. 5 shows an example of a reflecting projection encoder configured with the laminate 55. As shown in FIG. 5(a), a projection encoder 51 has an LED 52 as a light source, a laminate 55 integrally formed with a plurality of transmission gratings 53 and a plurality of photodiodes 54, and a reflecting grating plate 57 with a plurality of reflecting gratings 56 formed on the surface thereof. The LED 52 and laminate 55 are disposed in fixed positions, and the transmission grating plate 57 can be moved.

The laminate 55 is composed of a glass substrate 58 and a silicon substrate 59, as shown in FIG. 4, and is disposed such that a side with the silicon substrate 59 faces the LED 52. The transmission gratings 53, which are formed by patterning a light-blocking film 53a, are formed on a surface (B surface) of the glass substrate 58 that faces the silicon substrate 59, as shown in FIG. 5(c). Also, electrode wiring layers 58c are formed on the left- and right-hand sides of the transmission gratings 53.

An aperture portion 59a with a size sufficient to include the forming region of the transmission gratings 53 is formed in the silicon substrate 59, as shown in FIG. 5(b), and a portion of the transmission gratings 53 is exposed therethrough to the LED 52. Rectangular notches 59b are also formed on the left- and right-hand sides of the silicon substrate 59, and the electrode wiring layers 58c formed in the glass substrate 58 are thereby exposed.

A- and B-phase photodiodes 54A and 54B, and Z-phase photodiodes 54Z are integrally formed on a surface (A surface) of the silicon substrate 59 that faces the glass substrate in the portions above and below the aperture portion 59a. Also, electrode pads 59d are formed in the portions on the left- and right-hand sides of the aperture portion 59a. The electrode pads 59d are connected to the corresponding electrode wiring layers 58c formed on the glass substrate 58 in a state in which the glass substrate 58 and the silicon substrate 59 are laminated together.

In the projection encoder 51 with this configuration, light emitted by the LED 52 passes through the transmission gratings 53 formed on the glass substrate 58 of the laminate 55, and illuminates the reflecting gratings 56 on the reflecting grating plate 57. An optical reflection image reflected by the reflecting gratings 56 passes through the glass substrate 58 of the laminate 55 and is detected by the photodiodes 54.

In the projection encoder 51 with this configuration, a metal thin film or another light-blocking film is vapor-deposited or sputtered on the glass substrate 58 to form the transmission gratings 53. Therefore, the transmission gratings can be formed inexpensively in comparison with cases in which transmission gratings are formed by opening through holes in the silicon substrate by dry etching or the like. Also, the transmission gratings can be formed with better shock and vibration resistance in comparison with transmission gratings formed on a silicon substrate.

Next, FIG. 6 is a schematic diagram showing a modified example of the projection encoder 51 shown in FIG. 5. The basic configuration of the projection encoder 61 of this example is the same as the projection encoder 51 described above, so the same symbols have been assigned to corresponding locations and a description thereof has been omitted.

In the projection encoder 61 of this example, wide A-phase photodiode 64A, A'-phase photodiode 64A', B-phase photodiode 64B, B'-phase photodiode 64B', Z-phase photodiodes 64Z, and Z'-phase photodiodes 64Z' are formed on the surface (A surface) of the silicon substrate 59 of the laminate 55. Formed on the surface (B surface) of the glass substrate 58 that faces these photodiodes are transmission grating windows 65A, 65A', 65B, 65B', 65Z, and 65Z' that are arranged at a constant pitch with a narrower width than the photodiodes. The transmission grating windows are formed by patterning a light-blocking film laminated on the glass substrate surface.

In the projection encoder 61 with this configuration, there is an advantage in that photodiodes do not need to be integrally formed at a very small pitch in the silicon substrate 59.

Next, an example of a transmissive projection encoder is shown in FIG. 7. As shown in FIG. 7(a), the projection encoder 71 has an LED 72 as a light source, a laminate 75 integrally formed with a plurality of transmission gratings 73 and a plurality of photodiodes 74, and a transmission grating plate 77 with a plurality of transmission gratings 76 formed on the surface thereof The LED 72 and the laminate 75 are disposed in fixed positions, and the transmission grating plate 77 can be moved.

The laminate 75 is composed of a glass substrate 78 and a silicon substrate 79, and is disposed such that a side with the glass substrate 78 faces the LED 72. Electrode wiring layers 78c are formed on a surface (B surface) of the glass substrate 78 that faces the silicon substrate 79 on the left- and right-hand sides thereof, as shown in FIG. 7(c). The A-phase and B-phase transmission gratings 73 are formed on an opposite surface (C surface), as shown in FIG. 7(d). The transmission gratings 73 are formed by patterning a light-blocking film 73a.

A- and B-phase photodiodes 74A and 74B are integrally formed on a surface (A surface) of the silicon substrate 79 in a portion that faces the transmission gratings 73, as shown in FIG. 7(b). Z-phase photodiodes 74Z are also integrally formed thereon. Electrode pads 79d are formed on the left- and right-hand sides of the photodiodes. Rectangular notches 79b are also formed on the left- and right-hand sides of the silicon substrate 79, and the electrode wiring layers 78c formed in the glass substrate 78 are thereby exposed The electrode pads 79d are connected to the corresponding electrode wiring layers 78c formed on the glass substrate 78 in a state in which the glass substrate 78 and the silicon substrate 79 are laminated together.

In the projection encoder 71 with this configuration, light emitted by the LED 72 first passes through the transmission gratings 76 on the transmission grating plate 77, then passes through the transmission grating 73 formed on the glass substrate surface of the laminate 75, and is finally received by the photodiodes 74 integrally formed in the silicon substrate 79 of the laminate 75.

As described above, in the projection encoder of the present invention, an SOQ substrate or a laminate body composed of a glass substrate and a silicon substrate is used and transmission gratings are formed by patterning a light-blocking film formed on the surface of the glass substrate. Transmission gratings can therefore be formed inexpensively in comparison with cases in which transmission gratings are formed by opening through holes in a silicon substrate by etching. Also, transmission gratings with excellent shock resistance, vibration resistance, and the like can be obtained.

What is claimed is:

1. A projection encoder, comprising:
   a light source,
   moving-side gratings arranged at a constant pitch,
   fixed-side gratings arranged at a constant pitch,
   a grid of photodetectors arranged at a constant pitch, and
   an SOQ substrate having a glass substrate and a silicon layer formed on a surface of the glass substrate; wherein
   the grid of photodetectors is integrally formed on the silicon layer of the SOQ substrate;
   transmission gratings are formed by laminating a light-blocking film onto a front surface or back surface of the glass substrate and patterning the blocking film; and
   the transmission gratings are either the moving-side gratings or the fixed-side gratings.

2. The projection encoder according to claim 1, wherein:
   the light-blocking film is laminated on a surface portion of the glass substrate that has been exposed by etching away the silicon layer of the SOQ substrate, and the transmission gratings are formed by patterning the light-blocking film; and one of the moving-side gratings and the fixed-side gratings are the transmission gratings, and the others are reflecting gratings.

3. The projection encoder according to claim 2, wherein:

a reflecting film is formed on the back surface of the glass substrate; and light emitted by the light source is first reflected from the reflecting gratings, is then allowed to reach the reflecting film via the transmission gratings and the glass substrate, is reflected by the reflecting film, and is subsequently directed to the grid of photodetectors.

4. The projection encoder according to claim 1, wherein:

both the moving-side gratings and fixed-side gratings are transmission gratings; and one of the two groups of transmission gratings is formed by laminating a light-blocking film on the back surface of the SOQ substrate and patterning the light-blocking film.

5. The projection encoder according to claim 1, wherein the silicon layer is formed directly on the glass substrate.

6. A projection encoder, comprising:

a light source, moving-side gratings arranged at a constant pitch, fixed-side gratings arranged at a constant pitch, a grid of photodetectors arranged at a constant pitch, and a laminate comprising a glass substrate and a silicon substrate laminated on a front surface of the glass substrate;

wherein the photodetectors are integrally formed in the silicon substrate from a surface thereof facing the glass substrate;

transmission gratings are formed by laminating a light-blocking film on the front surface or a back surface of the glass substrate, and patterning the light-blocking film; and the transmission gratings are either the moving-side gratings or the fixed-side gratings; wherein:

the transmission gratings are formed on a surface of the glass substrate that faces the silicon substrate; and a portion of the silicon substrate that faces the transmission gratings is fashioned into an aperture portion.

7. The projection encoder according to claim 6, wherein:

at least one photodetector provided with a light-receiving surface of a predetermined width is integrally formed on the silicon substrate instead of the grid of photodetectors; and a light-blocking film is laminated to a surface portion of the glass substrate that faces the light-receiving surface, and the light-blocking film is patterned, whereby transmission grating windows arranged at a constant pitch are formed.

8. The projection encoder according to claim 6, wherein:

an electrode wiring film is formed on a surface of the glass substrate that faces the silicon substrate; and a portion of the silicon substrate that faces the electrode wiring film is removed to expose the electrode wiring film.

9. The projection encoder according to claim 6, wherein:

an electrode wiring film is formed on a surface of the glass substrate that faces the silicon substrate; and a portion of the silicon substrate that faces the electrode wiring film is removed to expose the electrode wiring film.

10. The projection encoder according to claim 7, wherein:

an electrode wiring film is formed on a surface of the glass substrate that faces the silicon substrate; and a portion of the silicon substrate that faces the electrode wiring film is removed to expose the electrode wiring film.

* * * * *